March 31, 1942.  C. C. COONS ET AL  2,278,378
REFRIGERATION
Filed Aug. 4, 1939  2 Sheets-Sheet 1

INVENTORS
Curtis C. Coons &
Rudolph S. Nelson
BY
Harry S. Demarest
ATTORNEY

March 31, 1942.  C. C. COONS ET AL  2,278,378
REFRIGERATION
Filed Aug. 4, 1939  2 Sheets-Sheet 2

INVENTORS
*Curtis C. Coons &*
*Rudolph S. Nelson*
BY
*Harry S. Dumaree*
ATTORNEY Patented Mar. 31, 1942

2,278,378

UNITED STATES PATENT OFFICE 2,278,378

REFRIGERATION

Curtis C. Coons, North Canton, Ohio, and Rudolph S. Nelson, Larchmont, N. Y., assignors to The Hoover Company, North Canton, Ohio Application August 4, 1939, Serial No. 288,298

10 Claims. (Cl. 62—119.5)

This invention relates to absorption refrigeration apparatus, and more particularly to a novel design, construction and arrangement of the various parts relative to each other and to a cabinet whereby the same may be entirely cooled by the room air.

Heretofore it has been customary to discharge heat from the absorber, condenser, rectifier, and other heat dissipating portions of the apparatus to a source of cooling water. This practice has been accompanied by many disadvantages and has limited the field of usefulness of the apparatus considerably.

It is accordingly an object of the present invention to provide an absorption refrigeration apparatus requiring no cooling water connections. More specifically, it is an object to provide an apparatus in which the heat from all the heat dissipating portions of the apparatus is discharged directly to the surrounding atmospheric air.

A further object of the invention is to provide a novel tubular absorber construction arranged in a novel manner at the lower end of a cooling air flue and so that the absorber is uniformly cooled throughout its extent to a maximum degree while providing a minimum resistance to the flow of cooling air thereover.

Another object of the invention is to so construct and locate the absorber with respect to an air flue that the absorption liquid passes through the absorber in counterflow to the general direction of air flow thereover, and such that the flow of cooling air over one portion of the absorber assists a flow over the remaining portion and up the air flue. For example, the portion of the absorber nearest the air flue may be at a higher elevation than other portions of the absorber whereby the hot air from said higher part of the absorber enters the air flue first and entrains the hot air rising from the other parts of the absorber. Another important feature of the novel arrangement is the fact that cooling air of uniform temperature passes over all portions of the absorber, and no part of the air passes over more than one section of the absorber.

Another object of the invention is to provide power driven means for circulating the inert gas between the absorber and the evaporator and for simultaneously by-passing a part of the inert gas into the absorption solution circuit to elevate absorption solution to an elevated point from which it may flow through the remainder of its circuit by gravity. More particularly, it is an object of the invention to employ power actuated means for circulating the inert gas and the absorption liquid through their respective circuits while permitting the inert gas to flow in counterflow with both the lean absorption solution and liquid refrigerant.

Another object of the invention is to provide a novel, air-cooled absorber having a minimum number of parts, and which is more efficient and more economical to construct.

A still further object of the invention is to provide a novel arrangement of the various parts of the apparatus both as respects the relative position of one element to another, and as respects the relation of the various elements to a conventional household refrigerator cabinet to achieve greater compactness, reliability and over-all operating efficiency when employing the room air as the cooling medium.

Still other objects and advantages will become apparent from the detailed description of a preferred embodiment of the invention which follows.

Figure 1:
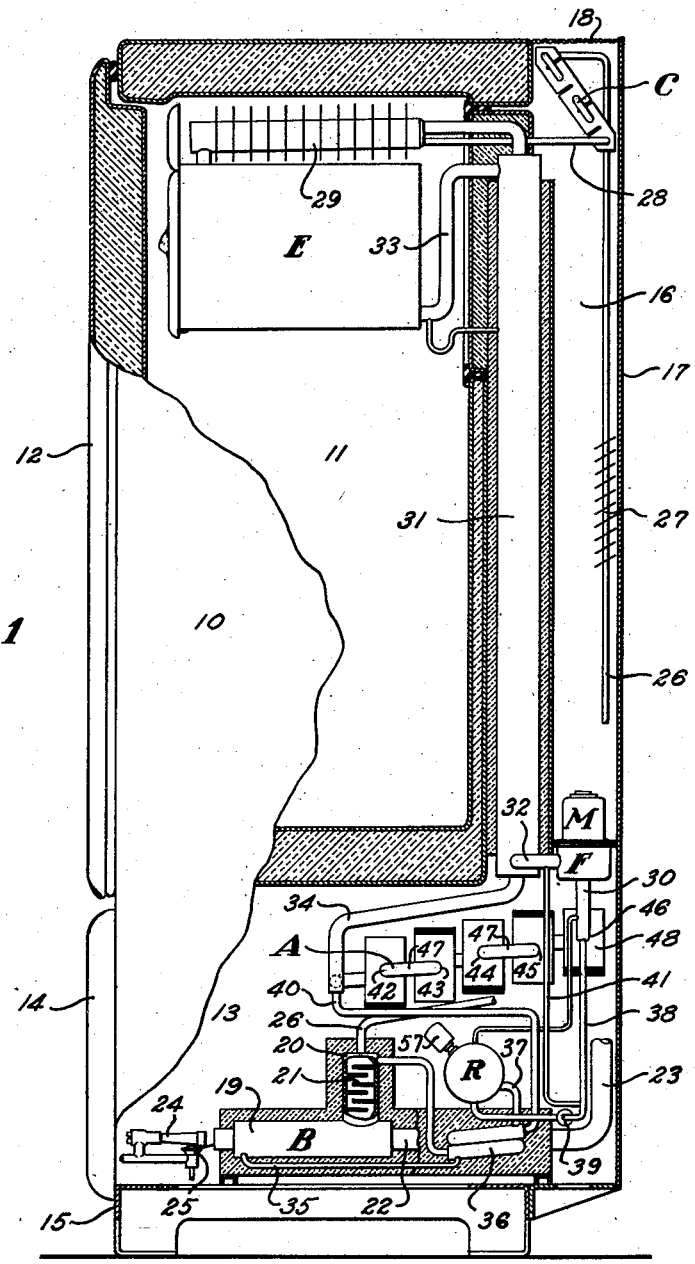
Figure 1 is a side elevational view mostly in section showing a preferred arrangement of an absorption refrigeration apparatus in position in a refrigerator cabinet.

Referring to Figure 1 it will be seen that the refrigeration apparatus proper consists in the main of a boiler B, an absorber A, an evaporator E, a condenser C, a motor-driven fan F, and an absorption solution reservoir R. These principal elements are connected in circuit by various conduits to provide a continuous three-fluid absorption system. The refrigeration apparatus may be constructed, charged and tested as a unit, and then inserted into a refrigerator cabinet 10 through the rear wall thereof as will be more fully described hereafter.

The refrigerator cabinet consists of an insulated food compartment 11 having a door 12 closing its front side. Below the food compartment is an apparatus compartment 13 which is closed at its front by a removable panel or door 14. Supporting the entire cabinet is a sheet metal or other suitable base 15 cut away at its sides and at its center to permit of a free flow of air from the room into all portions of the apparatus compartment.

To the rear of the food compartment is a shallow air flue 16 extending for the full height and width of the cabinet, and cooperating with the apparatus compartment to house the refrigeration apparatus and to provide for a free flow of cooling air thereover. The rear side of the air flue is preferably closed by a sheet metal plate 17, although this plate may be perforated or louvered if desired. Overlying the top of the air flue is a screen 18.

The refrigeration apparatus proper will now be described:

This apparatus comprises a boiler assembly B having a main, horizontal portion 19 and an analyzer 20 extending upwardly therefrom near one end. The analyzer is preferably provided with baffle plates 21. A tube 22 passing through the boiler provides a heating or combustion chamber. A suitable heating device, as a Bunsen gas burner 24, is positioned in front of one end of the combustion chamber, and the products of combustion are led from the opposite end by conduit 23 arranged to distribute the products of combustion into the upper part of the air flue 16 in such manner as not to interfere with the cooling of condenser C.

The heating device may be provided with a suitable automatic control device subject to the temperature of the evaporator or the temperature of the food compartment so as to control the heat supplied to the boiler in accordance with the demand for refrigeration. It is also desirable to provide the control with safety devices to guard against abnormal operating conditions. For example, the gas burner is shown as provided with a snap-acting thermostatic safety cut-off device 25 of known form and operable to cut off all fuel to the burner in the event of flame failure.

The refrigerant vapor generated in the boiler passes upwardly through analyzer 20, and then through conduit 26, rectifier 27 and into the top of condenser C. The condenser extends across the air flue and is preferably inclined downwardly and outwardly thereacross for several important reasons. The hottest portion of the condenser is located at the top of the air flue so that the hot air rising from the condenser does not pass into contact with the back of the food compartment. Moreover, the direction of flow of the heated air is upwardly and outwardly away from the food compartment. Also, due to the inclined position of the condenser, it will be observed that the point of discharge of liquid refrigerant is at a minimum distance below the top of the air flue, thus permitting the evaporator to be located at a maximum height in the food compartment.

Another advantage of considerable importance is the fact that the condenser offers a uniform resistance to air flow across the entire air flue, and permits air of the same temperature to contact all portions of the condenser. Furthermore, the cooling air traverses the condenser but a single time.

The liquid refrigerant flows from the condenser through conduit 28 into the box cooling portion 29 of evaporator E, and thence downwardly through the evaporator as it evaporates into an inert gas, such as hydrogen or nitrogen. The evaporator may be of any convenient design as for example, a continuous conduit bent into suitable form to provide a continuous downwardly inclined path for the liquid refrigerant. A suitable casing for this conduit may be provided having means for supporting ice trays in heat conducting relation to the conduit.

The evaporator is connected in a continuous circuit with the absorber, and the entire circuit is filled with the inert pressure equalizing gas. This circuit comprises conduit 30, fan F, conduit 32, gas heat exchanger 31, conduit 33, evaporator E, conduit 29, the inner passage of heat exchanger 31, conduit 34, and absorber A. The fan is driven by a motor M, at least the rotor of which is hermetically sealed within the refrigeration system, and circulates the gas upwardly through both the absorber and the evaporator. Thus, the gas circulates in counterflow to the absorption solution in the absorber and to the liquid refrigerant in the evaporator.

The absorption solution circuit includes boiler B and the absorber. The lean solution leaves the boiler through conduit 35 and flows to the solution heat exchanger 36, and then into reservoir R through conduit 37. Conduit 38 leads from the reservoir into the uppermost end of the absorber, and preferably includes a finned precooler 39. After flowing downwardly through the absorber, the solution returns to analyzer 20 and the boiler through conduit 40 which includes heat exchanger 36.

In order to elevate the lean absorption solution into the absorber, which is located considerably above the boiler assembly, we employ a gas lift pump which merely comprises a part of the lean solution conduit 38, and a small conduit supplying gas thereto under pressure. Referring to Figure 1 it will be seen that a small conduit 41 leads from the discharge side of fan F into the lower part of that portion of conduit 38 extending between the precooler and the absorber. Since the discharge end of conduit 38 is connected to the inlet side of the fan, and conduit 40 is connected to the discharge side, it will be appreciated that the full pressure differential developed by the fan is utilized to inject a small proportion of the inert gas into the solution circuit to elevate the solution and thereby circulate the same in its circuit. We have found that superior results are obtained if a comparatively dense inert gas like nitrogen is utilized.

This type of pump has several important advantages over other types of solution circulators. One of its outstanding characteristics is its obvious simplicity. Another feature is the fact that a non-condensible gas is used to operate the pump, as contrasted with a hot condensible vapor generated within the system, such as refrigerant vapor distilled from the solution in boiler B, which may partially or wholly condense upon contact with the solution being pumped. It is also apparent that the solution circulation can be proportioned to the inert gas circulation in any desired ratio. Moreover, the solution circulation can be controlled entirely independently of the heat supplied to the boiler.

One of the particularly important features of our invention pertains to the novel construction of the absorber, and its functional and structural relation to the other elements of the system including the refrigerator cabinet.

Figure 2:
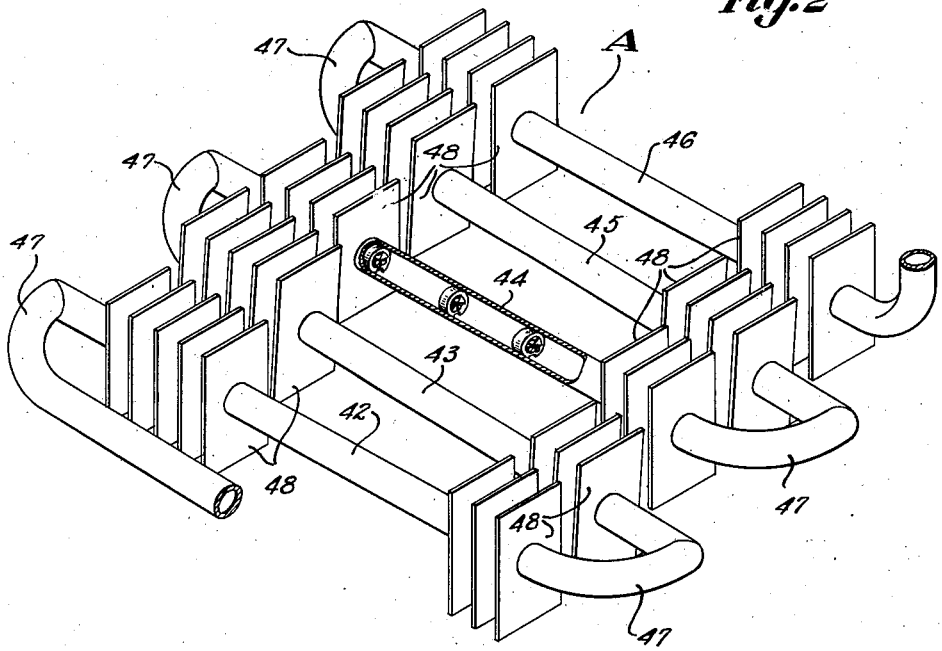
Figure 2 is a perspective view of the absorber.

The absorber is shown in side elevation in Figure 1, and in perspective in Figure 2. As clearly indicated in Figure 2, the absorber comprises five conduits 42, 43, 44, 45 and 46. One end of each conduit is straight while the opposite end is bent as indicated at 47. The heat dissipating fins 48 are pierced and then pressed upon the straight portions of the individual conduits over the unbent ends thereof. The unbent ends of the conduits are then joined to the bent ends, as by welding, to form a continuous fluid passageway from the inlet end to the outlet end of the absorber. It will also be understood that the conduits are secured together in such a manner that each conduit is inclined slightly to the horizontal, and so that when the fins are in vertical position, as shown in Figure 1, the assembled absorber conduits will be inclined slightly to the horizontal in a plane at right angle to the length of the conduits. Alternate conduits are inclined downwardly in one direction, while the remaining conduits are inclined in an opposite direction, as appears in the drawings.

Figures 3, 4:
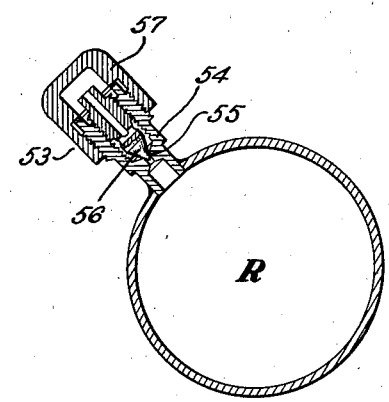
Figure 3 shows one of the absorber inserts.
Figure 4 is a cross-sectional view of the solution reservoir showing details of the charging device.

In order to secure maximum agitation and contact within the absorber between the gaseous medium and the absorption solution, we prefer to position gas swirling or deflecting elements within the straight portions of the absorber conduits. A form of insert which we have found quite satisfactory for this purpose is illustrated in Figure 3, and comprises in this instance of a pressed sheet metal cup, although it will be understood that any suitable deflecting means can be employed. The bottom of the cup is provided with vanes stamped therefrom to permit the gas to flow through the cup while imparting a rotary motion thereto. The angle to which these vanes are bent provides a very convenient means for controlling the resistance to the gas flow and thereby the rate of flow through the inert gas circuit. The under side of the insert is cut away as at 51 to permit the absorption solution to flow past the insert. The inserts, when spaced apart as indicated in Figure 2, have been found to give very satisfactory results.

The absorber is connected in the inert gas and the absorption liquid circuits in such manner that the inert gas enters the lower end of the absorber and exits from the upper end thereof, while the lean absorption solution is delivered to the upper end of the absorber and flows downwardly in counterflow to the inert gas.

The advantages of this absorber, from both a functional and a constructional standpoint, are numerous and readily apparent. The motor driven fan F forcibly circulates the refrigerant-laden, inert gas over the absorption liquid at a rapid rate and the deflecting vanes cause the gas to be repeatedly swirled in a spiral path, first into contact with the surface of the absorption liquid and then into contact with the upper portions of the interior of the conduits where the heat of absorption is transferred to the conduit and the heat dissipating fins. This swirling of the gas also causes the surface of the absorption liquid to be agitated and thereby prevents stratification and the formation of stagnant pools of solution. Restricted openings 51 in the inserts, as well as the agitation of the liquid by the gas, enable the absorber to be inclined appreciably to the horizontal to insure uniform distribution and gravity flow of solution through the absorber and yet retard the flow sufficiently to permit maximum absorption of the refrigerant vapor and the most efficient operation of the absorber. For the foregoing reasons, as well as others, we have been enabled to obtain highly superior results by our simplified construction involving the use of much less material than has heretofore been considered necessary.

It will also be observed that the absorber is positioned directly below the food compartment with some of the conduits directly beneath the food compartment and part of the tubes extending into the vertical air flue 16. We have found that maximum flow of air and maximum cooling of the absorber can be achieved by locating the absorber in the position shown in Figure 1. Thus the hot air rising from conduit sections 45 and 46 appears to induce an increased flow of air over the conduit sections directly beneath the food compartment. This action is favorably affected by locating conduits 45 and 46 at the bottom of flue 16 and near the rear bottom corner of the food compartment, but these conduits should not be so high as to throttle the flow of air from the foremost conduits of the absorber or to cause the hot air which has risen above the foremost conduits to again pass in contact with the heat dissipating fins of other conduits.

When constructed as shown, the cooling air tends to rise vertically over all portions of the absorber, and the air which has passed above any given portions of the fins does not contact any of the other fins. Thus, air at the lowest cooling temperature available contacts all corresponding portions of the absorber at approximately the same temperature although it will be understood that the exit temperature of the air at different portions of the absorber may vary due to the fact that certain portions of the absorber may be at higher temperatures than other portions.

The boiler assembly and the solution heat exchanger, as well as reservoir R, are preferably located at one side of the apparatus compartment and sufficiently below absorber A as not to affect the uniform flow of cooling air over all portions of the absorber.

Heat dissipating fins 48 on the absorber are preferably positioned perpendicular to the straight portions of the conduits, and since the conduits are inclined slightly to the horizontal, it will be clear that the fins are inclined slightly to the vertical. The cooling air tends to rise vertically, but due to the inclined position of the fins is deflected, thus causing the cooling air to glide across the surfaces of the fins in more intimate heat exchange relationship. This would appear to constitute another factor enabling us to reduce the number and the area of the fins.

As appears from Figure 1, condenser C is inclined across air flue 16 from the top, forward corner of the same. This arrangement has several advantages. Among these are the fact that the hottest or upper end of the condenser is separated from the food compartment by a maximum amount of cabinet insulating material. The cooling air which passes over the condenser and is heated thereby, is deflected away from the food compartment wall and is prevented from ever contacting the back of the cabinet wall. The positioning of the condenser entirely across the flue causes the cooling air to be distributed uniformly over all parts of the condenser, and the hot condenser effectively promotes the flow of cooling air through all portions of flue 16. However, since the hottest portion of the condenser will promote the flow of cooling air more than colder portions thereof, it is clear that this arrangement automatically causes a maximum flow of air over the hottest portion.

For reasons which will be obvious from the foregoing discussion in connection with the condenser arrangement, it will be clear that the positioning of the condenser in the air flue cooperates with the novel construction and arrangement of the absorber to augment the flow of cooling air over the heat dissipating portions of the apparatus.

Figure 4 is a cross-sectional view through the solution reservoir R and charging device 53. We have found the reservoir to be a particularly desirable location for the charging device due to the location of the reservoir in the lower, forward part of the apparatus compartment, and to the fact that the capacity of the reservoir permits the apparatus to be charged rapidly.

The charging device comprises an interiorly and exteriorly threaded shank 54 welded to the reservoir. The interior of the shank is provided with a valve seat 55, a hollow needle valve 56 is threaded into shank 54 and normally seats against 55. After the apparatus has been charged with the refrigerant medium, the absorbent medium and the inert gas, a cap 57 is tightly secured to shank 53.

From the foregoing it will be manifest that we have provided an absorption refrigeration apparatus, especially adapted for use in connection with domestic refrigerators which is not only novel in construction and arrangement, but which also functions in an improved manner. By virtue of our novel combination and arrangement of an air-cooled absorber and an air-cooled condenser, in combination with a power operated inert gas circulator, we are enabled to obtain an over-all performance and operating efficiency while relying upon the ambient air as the cooling medium which far exceed the results obtainable from prior constructions.

While only a single embodiment of the invention has been shown and described herein, it is obvious that various changes and modifications may be made without departing from the spirit of the invention or the scope of the claims.

We claim:

1. In combination with a refrigerator cabinet having a storage compartment and a cooling air passageway extending along said compartment exteriorly thereof, of an absorption refrigeration apparatus having heat dissipating portions located in said cooling air passageway and heat absorbing portions located in heat exchange relation with said storage compartment, said apparatus being characterized by the provision of an evaporator, a boiler, an absorber, conduits connecting said evaporator and absorber in a closed inert gas circuit, power actuated means for forcibly circulating inert gas in said circuit, means providing an absorption solution circuit between said boiler and said absorber, means for by-passing a part of the gas from said inert gas circuit to said solution circuit to promote the circulation of the absorption solution, said absorber comprising a plurality of conduits which have a straight major portion and a bent minor portion at one end, heat dissipating fins on said straight portions, the straight ends of said conduits being joined to the bent ends in such manner as to provide an absorber having a continuous fluid passageway from one end thereof to the other which is inclined slightly to the horizontal substantially throughout its length, and means within said absorber for causing the inert gas to pass therethrough in a swirling path as it is forcibly circulated by said power actuated means.

2. In combination with a refrigerator cabinet having a storage compartment and a cooling air passageway extending along said compartment exteriorly thereof, of an absorption refrigeration apparatus having heat dissipating portions located in said cooling air passageway and heat absorbing portions located in heat exchange relation with said storage compartment, said apparatus being characterized by the provision of an evaporator and absorber, conduits connecting said evaporator and absorber in a closed inert gas circuit, power actuated means for forcibly circulating inert gas in said circuit, said absorber comprising a plurality of conduits which have a straight major portion and a bent minor portion at one end, heat dissipating fins on said straight portions, the straight ends of said conduits being joined to the bent ends in such manner that the straight portions lie in side-by-side relation with alternate straight portions inclined downwardly slightly to the horizontal in one direction and the remaining straight portions inclined downwardly slightly to the horizontal in the opposite direction to provide an absorber having a continuous fluid passageway from one end thereof to the other, and means within said absorber for causing the inert gas to pass therethrough in a spiral path while permitting the free flow of a liquid through the absorber along the bottom thereof.

3. In combination with a refrigerator cabinet having a storage compartment and a cooling air passageway extending along said compartment exteriorly thereof, of an absorption refrigeration apparatus having heat dissipating portions located in said cooling air passageway and heat absorbing portions located in heat exchange relation with said storage compartment, said apparatus being characterized by the provision of a boiler, an evaporator, an absorber, conduits connecting said evaporator and absorber in a closed inert gas circuit, conduits forming an absorption solution circuit between the boiler and absorber, power actuated means for forcibly circulating inert gas in said gas circuit in a direction from said evaporator to said absorber and back to the evaporator, means for by-passing a part only of the inert gas into said solution circuit to circulate the solution therein, said absorber comprising a plurality of conduits each of which has a straight major portion and a bent minor portion at one end, heat dissipating fins spaced along said straight portions, the straight end of said conduits being joined to the bent ends of other conduits in such manner that the straight major portions of the conduits are arranged in side-by-side relation and in the same general plane but with alternate conduits inclined slightly to the horizontal in one direction and the remaining conduits inclined slightly to the horizontal in the opposite direction, and so as to provide an absorber having a continuous fluid passageway from one end thereof to the other, said absorber being so arranged in said cooling air passageway that cooling air which has passed in contact with one conduit and its associated fins does not thereafter contact a second absorber conduit whereby all portions of said absorber are contacted by cooling air of substantially the same temperature, and means within said absorber conduits for causing the circulating inert gas to flow first in contact with a lower portion of the interior of the conduit and then in contact with an upper portion thereof as it is forcibly circulated by the power actuated means.

4. In combination with a refrigerator cabinet having a storage compartment and a cooling air passageway extending along said compartment exteriorly thereof and having an air inlet in a lower portion thereof and an outlet in an upper portion, of an absorption refrigeration apparatus having a tubular air-cooled condenser vessel adjacent the outlet of said passageway, an evaporator within said storage compartment, a boiler, a tubular air-cooled absorber vessel in said cooling air passageway, means connecting said condenser to the evaporator, conduits forming an inert gas circuit including said evaporator and absorber, power driven means operative to circulate inert gas through said gas circuit, conduits forming in a liquid circuit between said absorber and said boiler, said absorber comprising a plurality of conduits each of which is provided with heat dissipating fins and is inclined slightly to the horizontal substantially throughout its length, means within said absorber for causing the circulating inert gas to contact alternately lower and upper portions of the interior of the absorber, both said absorber and said condenser being positioned crosswise of the direction of air flow through said air cooling passageway and in such manner that cooling air which has passed in contact with one conduit of one of said vessels does not thereafter contact an adjacent conduit of the same vessel, and means for diverting a portion only of the inert gas into said liquid circuit to cause circulation of the liquid.

5. In combination with a refrigerator cabinet having a storage compartment and a cooling air flue extending vertically alongside thereof, said passageway including a relatively wide lower portion and a relatively narrow upper portion, of an absorption refrigeration apparatus located in said flue including a tubular air-cooled condenser vessel positioned crosswise of said narrower portion of the flue, a tubular air-cooled absorber vessel positioned crosswise of said wide portion of the flue, a boiler assembly adjacent said absorber, an evaporator within the storage compartment, means providing a refrigerant medium circuit between said boiler, condenser, evaporator and absorber, means providing an absorption solution circuit between said boiler and absorber, and means providing an inert gas circuit between said absorber and evaporator, means, including power operated means within the inert gas circuit, operative to circulate the major portion of the inert gas through the inert gas circuit and a minor portion of the gas through the solution circuit to circulate absorption solution therethrough, the last two mentioned circuits being so arranged that the absorption solution and inert gas flow through the absorber in counterflow, means within the absorber for causing the inert gas to pass repeatedly in contact with absorption solution and then into contact with the walls of the absorber at an angle to the direction of flow of gas through the absorber, the conduits of one of said tubular air-cooled vessels being so arranged in said cooling air flue that air which has passed in contact with one portion of said vessel does not thereafter flow in contact with another portion.

6. In combination with a refrigerator cabinet having a storage compartment and a cooling air flue extending vertically alongside thereof, said passageway including a relatively wide lower portion and a relatively narrow upper portion, of an absorption refrigeration apparatus located in said flue including a tubular air-cooled condenser positioned crosswise of said narrower portion of the flue, a tubular air-cooled absorber positioned crosswise of said wide portion of the flue, a boiler assembly adjacent said absorber, an evaporator within the storage compartment, means providing a refrigerant medium circuit between said boiler, condenser, evaporator and absorber, means providing an absorption solution circuit between said boiler and absorber, means providing an inert gas circuit between said absorber and evaporator, power operated means for circulating the inert gas in its circuit, a gas lift pump in said absorption solution circuit for circulating the solution in its circuit, means for diverting some of the inert gas under pressure from the inert gas circulator to actuate said pump, and means within said absorber for causing the inert gas to flow repeatedly in contact with absorption solution and then into contact with an upper part of the tubular absorber whereby heat of absorption is distributed directly to an upper portion of the absorber for dissipation to the cooling air flowing across the exterior of the absorber.

7. In an absorption refrigerating apparatus of the type having an inert gas circuit between the evaporator and the absorber including a gas heat exchanger and a motor driven circulator unit for the inert gas hermetically sealed in the inert gas circuit between the absorber and the gas heat exchanger in which the apparatus is assembled into a cabinet having a heat insulated food storage compartment, a combined air flue and apparatus compartment including a relatively wide chamber below the food storage compartment and a relatively narrow chamber extending upwardly therefrom along the food storage compartment, with the evaporator in the food storage compartment, the absorber in the relatively wide chamber with a portion thereof below the relatively narrow chamber, characterized by the fact that the motor driven circulator unit is positioned in the air flue above a portion of the absorber.

8. An absorption refrigerating apparatus, in combination with a cabinet having a vertically extending flue for the circulation of air over the heat rejecting parts of the apparatus, said apparatus including an evaporator, an absorber and a generator, conduits connecting said evaporator and absorber to form an inert gas circuit therebetween, conduits connecting said generator and absorber to form a solution circuit therebetween and an electrically operated unit for circulating a medium in the apparatus, said electrically operated unit being positioned in said vertically extending flue whereby air flowing therethrough will carry away heat generated by the electrically operated unit.

9. An absorption refrigerating apparatus in combination with a cabinet having a vertically extending flue for the circulation of air over the heat rejecting parts of the apparatus, said apparatus including an evaporator, an absorber and a generator, conduits connecting said evaporator and said absorber to form an inert gas circuit therebetween, conduits connecting said generator and absorber to form a solution circuit therebetween, an electrically operated unit for circulating an inert gas in said inert gas circuit, and means for utilizing a portion of said inert gas under pressure for circulating solution in said solution circuit, said electrically operated unit being positioned in said vertically extending flue above said absorber and solution circuit.

10. A refrigerating apparatus comprising a cabinet having a food storage compartment and an air passageway, said passageway comprising an apparatus compartment below said food storage compartment and a narrow air flue extending upwardly along one wall of said food storage compartment, an absorption refrigerator assembled with said cabinet having an evaporator positioned in said food storage compartment, a generator and an absorber positioned in said apparatus compartment and a condenser positioned in said narow air flue, said evaporator and absorber being connected by conduits to form an inert gas circuit therebetween, said generator and absorber being connected by conduits to form a solution circuit therebetween, an electrically driven circulator unit for circulating an inert gas in said inert gas circuit, said electically driven circulator unit being positioned in said narrow air flue above said absorber and solution circuit whereby heat therefrom will be dissipated to air flowing through said narrow air flue and solution from said solution circuit cannot interfere with said circulator unit.

CURTIS C. COONS.
RUDOLPH S. NELSON.